United States Patent [19]
Lisi

[11] Patent Number: 5,310,383
[45] Date of Patent: May 10, 1994

[54] SPLIT MOTORCYCLE DRIVE PULLEY

[76] Inventor: Eugene A. Lisi, House 101, Rt. 96, Geneva, N.Y. 14456

[21] Appl. No.: 3,131

[22] Filed: Jan. 12, 1993

[51] Int. Cl.$^5$ .............................................. F16H 55/46
[52] U.S. Cl. ........................................ 474/95; 474/98
[58] Field of Search .................................... 474/95-99

[56] References Cited
U.S. PATENT DOCUMENTS

| | | |
|---|---|---|
| 737,075 | 8/1903 | Carlson . |
| 826,757 | 7/1906 | Waterfield ............................ 474/98 |
| 1,363,772 | 12/1920 | Gilbert . |
| 1,656,935 | 1/1928 | Bahan . |
| 2,269,821 | 1/1942 | Kemphert et al. . |
| 3,097,541 | 7/1963 | Kindig ................................. 474/98 |
| 4,506,559 | 3/1985 | Francke et al. . |
| 5,037,356 | 8/1991 | Gladczak et al. ...................... 474/95 |
| 5,057,058 | 10/1991 | Crudup ................................ 474/95 |

Primary Examiner—Thuy M. Bui
Attorney, Agent, or Firm—Cumpston & Shaw

[57] ABSTRACT

A motorcycle drive pulley is diametrically split to eliminate the necessity for removing the motorcycle rear wheel in order to change drive pulleys. The split drive pulley bolts to the rear wheel of a belt driven motorcycle. The pulley has a first surface which faces away from the wheel and is generally convexly dished with respect to the wheel, while a second pulley surface faces and is adjacent to the wheel and is generally concavely dished with respect to the wheel. The pulley halves are diametrically symmetric, however the first and second surfaces are nonsymmetric. The pulley is constructed from a suitable self lubricating nylon or plastic which results in increased drive belt longevity. A method for installing the pulley without the need to remove the rear motorcycle wheel is also disclosed.

25 Claims, 2 Drawing Sheets

SPLIT MOTORCYCLE DRIVE PULLEY

BACKGROUND OF THE INVENTION

1. Field of the Invention

This invention relates to a split drive pulley for belt driven motorcycles, and to a method for installing the pulley absent the need to remove the rear wheel of the motorcycle.

2. Description of the Related Art

Split pulleys and gear wheels are sparsely described in the literature. Most are concerned with attaching a pulley or gear wheel to a shaft by simple and secure means and reducing wear due to particularly demanding use.

Entirely more relevant to the present invention in terms of the problems associated with the existing art, and to the objects of the present invention, are the factory supplied drive pulleys for belt driven motorcycles, particularly Harley Davidson motorcycles manufactured since about 1980. These are one piece pulleys that slide over the motorcycle rear axle and bolt to the rear wheel; the wheel and attached pulley being positioned intermediate the rear axle supporting frame members, thus necessitating the total disengagement of the rear wheel from the motorcycle when, for any reason, the pulley is removed from the wheel. One-piece motorcycle drive pulleys typically comprise a rim section having shoulders for lateral constraint of the drive belt, in which the rim circumference is grooved to engage the depressions along the inner surface of the drive belt. Currently, factory supplied drive pulleys for Harley Davidson motorcycles are made of cast aluminum and require special tools for alignment. Belt conditioning lubricants are recommended due to belt wear from the metal pulley surface; however, applied lubricants or conditioners attract dirt and debris which cling to the belt and pulley. Furthermore, the pulley shoulders trap this dirt which, upon buildup, can cause the pulley to go out of round and become misaligned. Most disadvantageously, as already mentioned, changing the pulley requires the removal of the rear motorcycle wheel with the inherent inconvenience of that procedure.

It is therefore an object of the present invention to provide a motorcycle pulley that, when removed or replaced, does not require the disassembly or removal of the rear motorcycle wheel.

It is a further object of the present invention to provide a shoulderless pulley that runs cleaner and is more easily aligned with the drive belt than current one-piece pulleys.

It is a still further object of the invention to provide a pulley that eliminates the need for externally applied belt conditioners and which contributes to longer drive belt life than currently supplied pulleys.

SUMMARY OF THE INVENTION

The present invention comprises a drive pulley that bolts to the face of the rear wheel of a belt driven motorcycle. Although the invention is a diametrically split pulley, the invention will be easier to understand if the pulley is first described in terms of a unitary device. The pulley comprises a conventional hub, web, and rim section. In the center of the hub section is a bore for the through-passage of the motorcycle rear axle. Bolt holes are positioned in the hub section around the circumference of the bore through which bolts are inserted for attaching the pulley to the motorcycle rear wheel. The web section of the pulley extends radially and integrally from the hub section and contains elongated cooling slots, the longer dimension of which is normal to the radial fan of the pulley, and which are equispaced around the web section. The rim section comprises the outer circumference of the pulley and includes teeth or grooves laying parallel to the axis of the bore for engaging the rippled inner surface of a motorcycle drive belt.

The pulley further has a first surface and a second surface; the first surface comprising the face of the pulley which faces away from the rear motorcycle wheel, and the second surface comprising the face of the pulley facing the motorcycle rear wheel. Although the diametric halves of the split pulley are symmetrical in terms of their semicircular radii, the first surface and the second surface are non-symmetrical. The first and second surfaces can be characterized as each having a generally dished shape that is most easily understood in terms of the respective first and second surfaces of the hub, web, and rim sections of the pulley. The first surfaces of the hub and rim sections are flat and lie in parallel planes with the plane containing the first surface of the rim section being slightly further outwardly displaced from the plane containing the first surface of the hub section with reference to the pulley as a whole. The first surface of the web section is also a flat surface and connects the plane of the hub section with the plane of the rim section. Thus, the plane containing the first surface of the web section is disposed at an angle of between 4° to 35° with respect to the planes of the first hub and rim sections.

The second surface of the pulley, on the other hand, is generally dished in a concave orientation towards the motorcycle wheel. The flat surface of the second web surface is likewise disposed at an angle to the parallel planes containing the second surfaces of the hub and rim sections respectively. However, the angle of disposition of the second web surface is between 4° and 40°. The dishing of the first and second pulley faces allows the pulley to be attached to the motorcycle rear wheel without interference with the wheel, and also provides lateral alignment with the drive sprocket of the motorcycle.

The combination of design and material of the instant split motorcycle drive pulley provides advantages over standard factory supplied drive pulleys in general, and the cast aluminum pulleys, in particular, that Harley Davidson motorcycles come equipped with.

The pulley is preferably manufactured from a self-lubricating nylon or plastic suitable for extruding or injection molding. Examples of such materials include "Nylotron" type 6/6 nylon or DuPont's "Delrin" acetal resin. "Nylotron" type 6/6 nylon, for example, is a self-lubricating nylon filled with molybdenum disulfide that bleeds during use. This bleeding or self-lubrication eliminates the need to grease drive sprockets or apply drive belt conditioners to the belt thus cutting down on maintenance expense, contributing to increased belt life by about 25%, and eliminating the accumulations of dirt and grime which stick to and are attracted to surfaces coated with externally applied lubricants. The "Nylotron" type 6/6 nylon split drive pulley also requires no more than mild soap and water to clean when necessary. Furthermore, the absence of any shoulders around the rim sections of the pulley eliminates any structure where dirt could accumulate in and become trapped.

The ability to change motorcycle drive ratios quickly and easily, to accommodate a rider's needs, is a convenience not presently available with one-piece/one size pulleys. During a street race, a motorcyclist may wish to use a larger diameter pulley because it contributes to higher revolutions per minute (rpm) at a given speed, and a quicker response; while on the other hand, a smaller diameter pulley develops more top end speed at lower rpm's, which is desirable for cross country tour riding, for example. The pulley of the present invention 10 is preferably manufactured in diameters comprising 68, 70, or 72 teeth; however, larger or smaller diameter pulleys are within the scope of the invention and simply depend on the particular make of the motorcycle. The split design of the pulley eliminates the necessity of having to remove the rear motorcycle wheel to install and/or remove the pulley, as is currently required to change the factory supplied one-piece pulley.

Having briefly described the design, construction, and application of the pulley of the present invention, reference is herein made to the drawings, wherein:

DETAILED DESCRIPTION OF THE INVENTION

Figure 2:
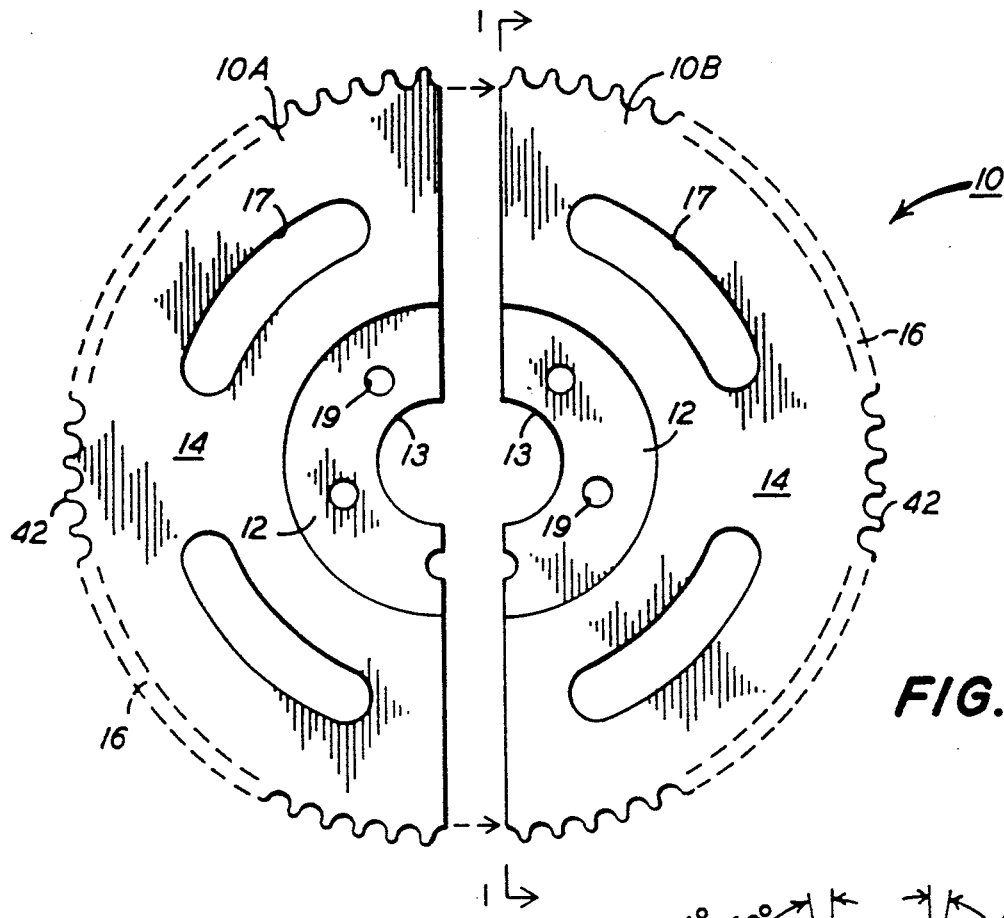
FIG. 2 is a front elevational view of the diametrically split halves of the pulley.
Figure 1:
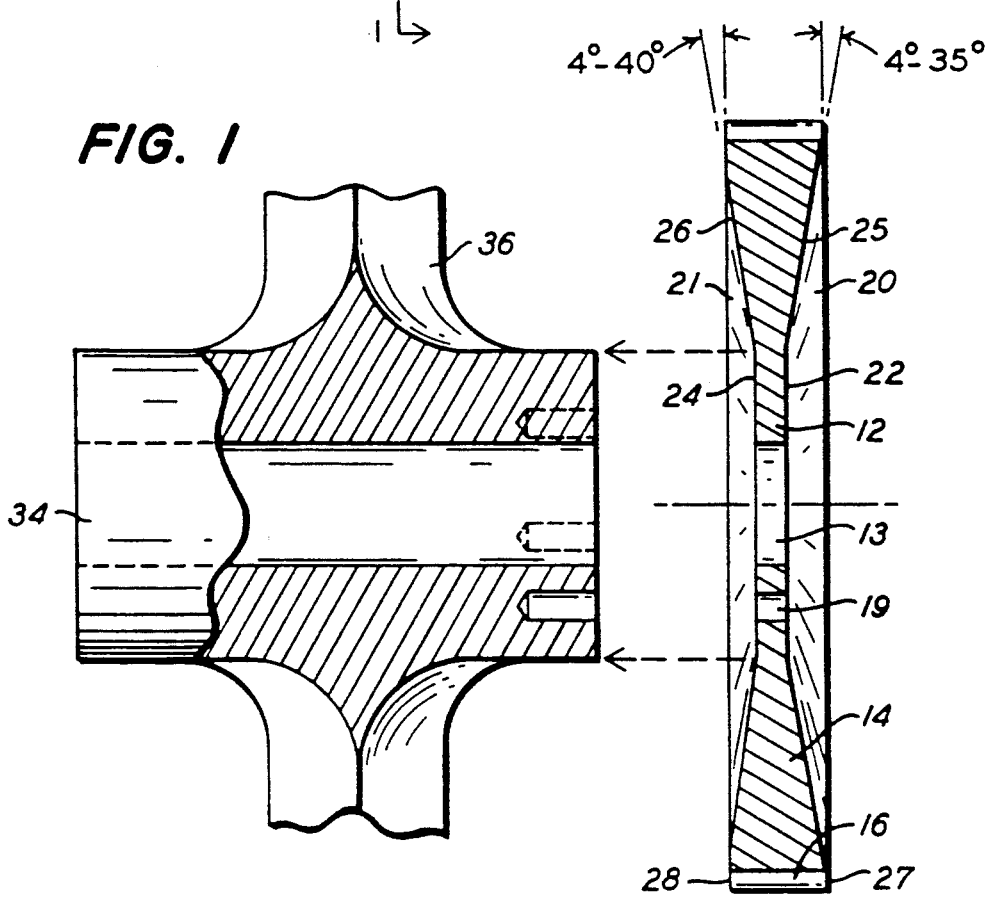
FIG. 1 is an exploded view of the split pulley and the rear wheel hub to which it connects.
Figure 3:
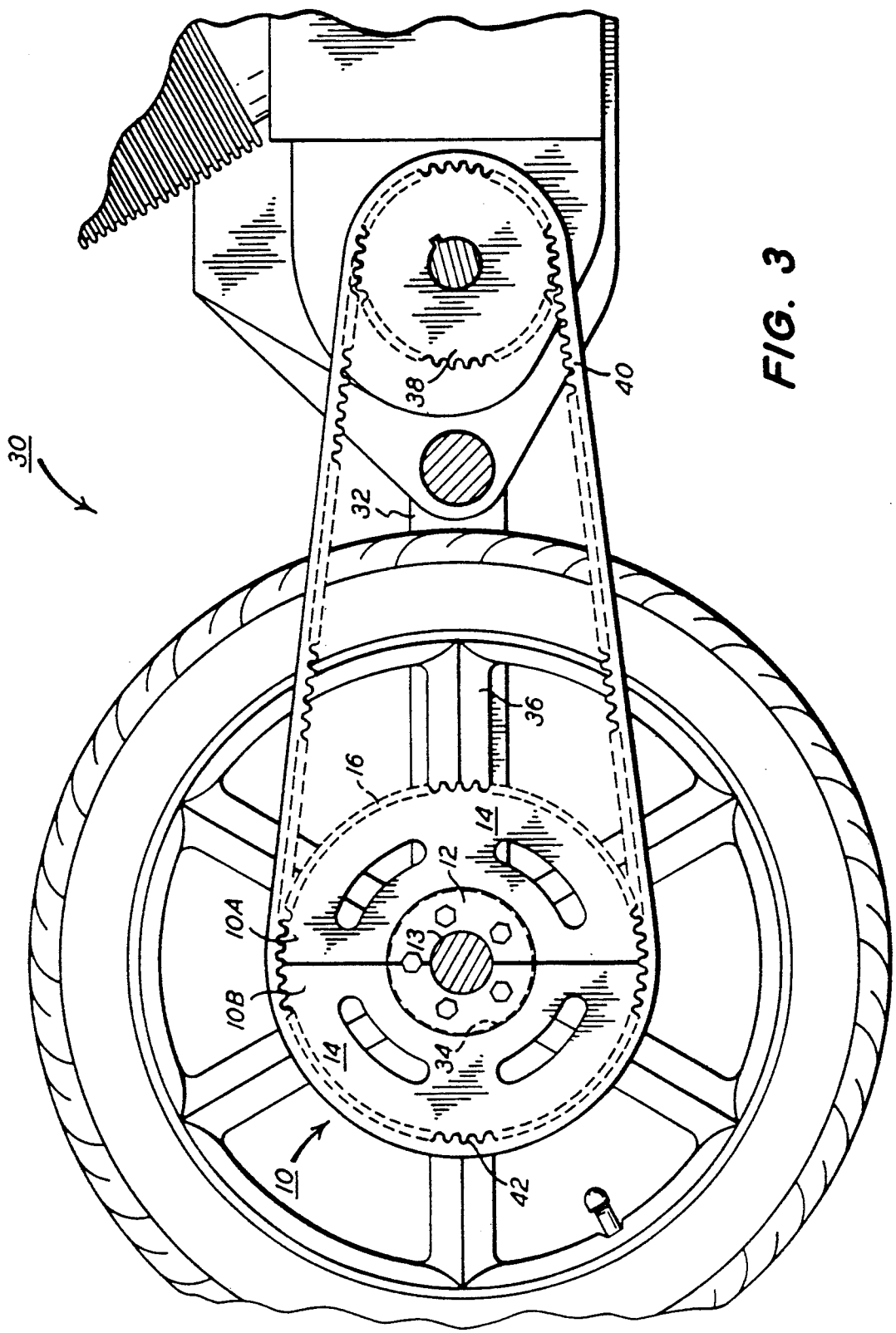
FIG. 3 is a side elevational view of the rear section of a belt driven motorcycle having a split pulley of the present invention operatively installed.

FIGS. 1, 2, and 3, wherein like numerals refer to like components throughout, show a preferred embodiment of the split motorcycle drive pulley 10 that is machined out of a block of "Nylotron" type 6/6 nylon. Alternatively, the pulley could suitably be injection molded from an engineered nylon/plastic combination material. The pulley, when viewed as an integral unit for clarity of description, comprises a hub section 12, a web section 14, and a rim section 16. Hub section 12 has a centered axle bore 13 and contains bolt holes 19 arranged to match the bolt hole pattern in the rear wheels of belt driven Harley Davidson motorcycles manufactured since 1980. Alternatively, the pulley is manufactured to fit any make of belt driven motorcycle.

The split pulley 10 is shown operatively installed on a representative belt driven motorcycle 30 in FIG. 3, which also shows the pulley's relationship to the frame 32, rear axle 34, driven rear wheel 36, drive means 38, and drive belt 40 of motorcycle 30. The integral pulley is characterized by a generally convex dish shaped first surface 20 with respect to the motorcycle rear wheel 36 and which faces away from the motorcycle rear wheel when installed, and a similarly concave dish shaped second surface 21 which faces towards the rear wheel. The contours of both the first and second surfaces 20, 21 of the pulley 10 are defined by the shape and orientation of the respective first and second surfaces of the hub, web, and rim sections 22, 24; 25, 26; 27, 28. Both the first and second surfaces 22, 24 of hub section 12 are flat and parallel. The first and second surfaces 27, 28 of the rim section 16 are likewise flat and parallel, all to each other and to the plane of rotation of the pulley. The first web section 25 is also flat; however, it lies in a plane disposed at an angle of between four and thirty five degrees to the planes of the first hub and rim surfaces 22, 27. Second web surface 26 is also flat but lies in a plane disposed at an angle of between four and forty degrees to the planes of the second hub and rim surfaces 24, 28. In a preferred embodiment, the angular disposition of first web surface 25 is different from that of second web surface 26, resulting in non-symmetrically dished first and second surfaces 20, 21.

FIG. 2 shows the two diametrically split halves 10A, 10B of pulley 10. Each half contains cooling slots 17 arranged circumferentially in the web section 14.

In one embodiment of the present invention the diameter of the pulley is sized to contain a total of 68 teeth 42. In another embodiment the diameter accommodates 70 teeth. Finally, a third embodiment comprises 72 teeth. Although these embodiments refer to split drive pulleys for belt driven Harley Davidson motorcycles, it should be understood that the invention embodies split drive pulleys having any appropriate diameter relevant to a particular make of motorcycle. Larger diameter pulleys are preferred when a rider desires higher rpm's at a given speed for a faster ride, while a smaller diameter pulley produces lower rpm's for a given speed which is desirable for tour riding, for example.

In actual use each of the halves 10A, 10B of the split pulley 10 are installed or removed individually from the rear motorcycle wheel 36 with no need to remove the wheel itself. The process of installing the pulley once the old pulley has been removed and while the rear motorcycle wheel is still engaged with the frame via the rear axle 34 simply involves loosening the rear motorcycle wheel axle attachment means from the frame so that some slack may be realized in the drive belt 40; bolting the replacement split pulley halves 10A, 10B to the wheel 36; retensioning the drive belt 40; and, resecuring the rear axle to the motorcycle frame axle supports. When the motorcycle is already equipped with a split pulley of the invention, a different split pulley can be installed in its place by simply loosening the rear axle attachment to the frame to provide some slack in the drive belt 40, unbolting each half of the pulley 10A, 10B from the wheel 36, and rebolting each new pulley half to the wheel and resecuring the axle upon retensioning the drive belt.

The invention is not limited to the foregoing detailed construction which is merely exemplary of the preferred forms of the invention. Other modifications, additions, and deletions are possible without departing from the scope of the invention as set forth in the appended claims.

I claim:

1. A pulley for driving a wheel to which the pulley is mounted comprising diametrically split halves, each pulley half including
   a rim section having means for engaging a drive belt;
   a web section contiguous with the rim section; and
   a hub section contiguous with the web section having
      a plurality of mounting holes for attaching the pulley halves to the wheel and a semi-circular axle bore for mounting each pulley half about an axle;
   whereby the pulley is replaceable without the need to slide the pulley off of the axle.

2. The pulley of claim 1 in which the web section has cooling slots formed therein.

3. The pulley of claim 1 further comprising means for putting the rim section in registration with a drive gear.

4. A pulley for driving a wheel to which the pulley is mounted comprising diametrically split halves, each pulley half including a rim section having means for engaging a drive belt;

a hub section having a plurality of mounting holes for attaching the pulley halves to the wheel and a semi-circular axle for mounting each pulley half about an axle; and a web section contiguous with the rim section and the hub section having an inner surface having a generally concave dish shape with respect to the wheel for positioning the rim section closer to the wheel than the hub section and an outer surface having a generally convex dish shape with respect to the wheel for positioning the rim section farther from the wheel than the hub section, whereby the pulley is replaceable without the need to slide the pulley off of the axle.

5. The pulley of claim 4 in which the inner surface and the outer surface are non-symmetrical.

6. The pulley of claim 1 in which the drive belt engagement means comprise a predetermined number of teeth around the circumference of the pulley for engaging grooves in the drive belt.

7. The pulley of claim 6 in which the circumference has between 68 and 72 teeth.

8. The pulley of claim 1 comprising a nylon pulley.

9. The pulley of claim 8 comprising a self-lubricating pulley.

10. The pulley of claim 1 comprising a plastic pulley.

11. The pulley of claim 10 comprising a self-lubricating pulley.

12. A pulley for driving the rear wheel of a motorcycle to which the pulley is mounted comprising diametrically split pulley halves, each pulley half including:

a rim section having means for engaging a drive belt;

a web section contiguous with the rim section; and a hub section contiguous with the web section having a plurality of mounting holes for attaching the pulley halves to the wheel and a semi-circular axle bore for mounting each pulley half about an axle;

whereby the pulley is replaceable without the need to slide the pulley off of the axle.

13. The pulley of claim 12 in which the drive belt engagement means comprise a predetermined number of teeth around the circumference of the pulley for engaging grooves in the drive belt.

14. The pulley of claim 13 in which the circumference has between 68 and 72 teeth.

15. The pulley of claim 12 comprising a self-lubricating nylon pulley.

16. The pulley of claim 12 comprising a self-lubricating plastic pulley.

17. The pulley of claim 12 in which the web section has cooling slots formed therein.

18. A motorcycle having easily changed drive ratios comprising:

a frame;

an engine having drive means, mounted in the frame;

an axle removable attached to the frame;

a rear wheel mounted on the axle;

a split drive pulley having diametrically split sections removably attached to the rear wheel and removable without removing the axle from the frame;

a drive belt coupling the drive means to the drive pulley.

19. The motorcycle of claim 18 in which the split drive pulley has a circumference containing a predetermined number of teeth.

20. The motorcycle of claim 19 in which the circumference has between 68 to 72 teeth.

21. The motorcycle of claim 18 comprising a self-lubricating nylon pulley.

22. The motorcycle of claim 18 comprising a self-lubricating plastic pulley.

23. A method for changing the drive ratio of a belt driven motorcycle having a split drive pulley attached to the rear wheel of the motorcycle without disengaging the motorcycle rear axle from the motorcycle frame comprising the steps of:

removing the split drive pulley from the rear motorcycle wheel;

providing a replacement split drive pulley having diametrically split sections and a pre-determined number of teeth;

removably attaching the replacement split drive pulley to the motorcycle rear wheel;

engaging a drive belt to the replacement split drive pulley;

tensioning the drive belt by slidably positioning the rear axle in the frame without removing the axle from the frame.

24. The method of claim 23 in which the step of removably attaching the replacement split drive pulley to the motorcycle rear wheel comprises the steps of independently bolting each split drive pulley section to the rear motorcycle wheel.

25. The pulley of claim 4 in which the web section has cooling slots formed therein.

* * * * *